US012619777B2

(12) United States Patent
Bachar et al.

(10) Patent No.: US 12,619,777 B2
(45) Date of Patent: May 5, 2026

(54) OBFUSCATION OF PERSONALLY IDENTIFIABLE INFORMATION

(71) Applicant: DEMOSTACK, INC., San Francisco, CA (US)

(72) Inventors: Eran Meshulam Bachar, Rosh Haayin (IL); Avraham Levi, Or Yehuda (IL); Ofir Rabanian, Tel Aviv (IL); Ben Sterenson, Ra'anana (IL); Gonen Tiberg, Tel Aviv (IL); Aaron Bar Hakim, Rishon LeZion (IL); Gilad Avidan, Tel Aviv (IL); Yehonatan Ernest Friedman, San Francisco, CA (US)

(73) Assignee: Demostack, Inc., San Francisco, CA (US)

( * ) Notice: Subject to any disclaimer, the term of this patent is extended or adjusted under 35 U.S.C. 154(b) by 227 days.

(21) Appl. No.: 18/351,574

(22) Filed: Jul. 13, 2023

(65) Prior Publication Data

US 2025/0021692 A1 Jan. 16, 2025

(51) Int. Cl.
*G06F 21/62* (2013.01)

(52) U.S. Cl.
CPC ................................. *G06F 21/6254* (2013.01)

(58) Field of Classification Search
CPC ......................... G06F 21/6254; G06F 21/6245
See application file for complete search history.

(56) References Cited

U.S. PATENT DOCUMENTS

| | | | | | |
|---|---|---|---|---|---|
| 11,205,236 | B1 * | 12/2021 | Smith | ....................... | G06N 3/09 |
| 12,131,233 | B1 * | 10/2024 | Kulkarni | .............. | G06F 16/245 |
| 2013/0203444 | A1 * | 8/2013 | Perry | ................. | C08G 18/4887 |
| | | | | | 455/456.3 |
| 2016/0021064 | A1 * | 1/2016 | Lock | .................... | H04L 63/0428 |
| | | | | | 726/26 |
| 2022/0092193 | A1 * | 3/2022 | Nijasure | ............... | G06F 21/602 |
| 2022/0405274 | A1 * | 12/2022 | Shang | ................. | G06F 16/2455 |
| 2023/0095576 | A1 * | 3/2023 | Ureche | .............. | G06F 21/6245 |
| | | | | | 726/26 |
| 2023/0114651 | A1 | 4/2023 | Bar Hakim et al. | | |
| 2024/0403483 | A1 * | 12/2024 | Wang | .................. | G06F 21/6254 |

OTHER PUBLICATIONS

Tiberg er al., U.S. Appl. No. 17/746,981, filed May 18, 2022.
Tiberg er al., U.S. Appl. No. 18/176,499, filed Mar. 1, 2023.

* cited by examiner

*Primary Examiner* — Andrew Suh

(74) *Attorney, Agent, or Firm* — Meitar Patents Ltd.; Daniel Kligler

(57) ABSTRACT

A method, including defining rules for protecting sensitive data, each of the rules including a reference URL and a reference JSON data mapping to an item of the sensitive data in a JSON payload. A proxy receives, from an application executing on a host computer, a query including a URL for data hosted by a server, and forwards the URL to the server. The proxy receives, from the server, a response to the forwarded URL, the response including a set of values stored in respective mappings. The URL and the mappings in the response are compared to the rules; and upon detecting a match between a given rule and a combination including the URL and a given mapping in the response, the proxy anonymizes by the proxy, the value stored at the given mapping in the response, and forwards the response, including the anonymized value, to the software application.

19 Claims, 9 Drawing Sheets

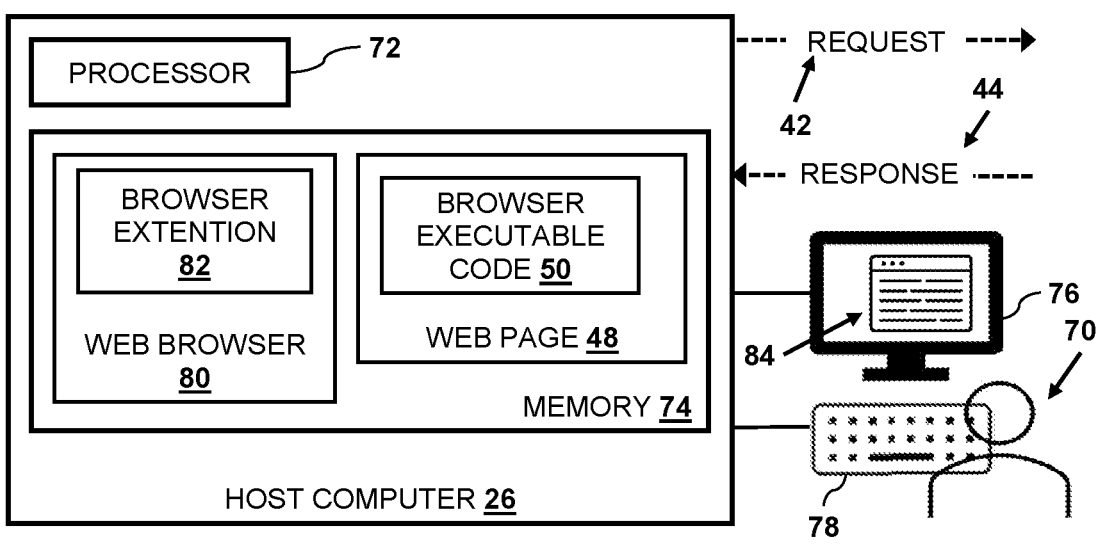
FIG. 2
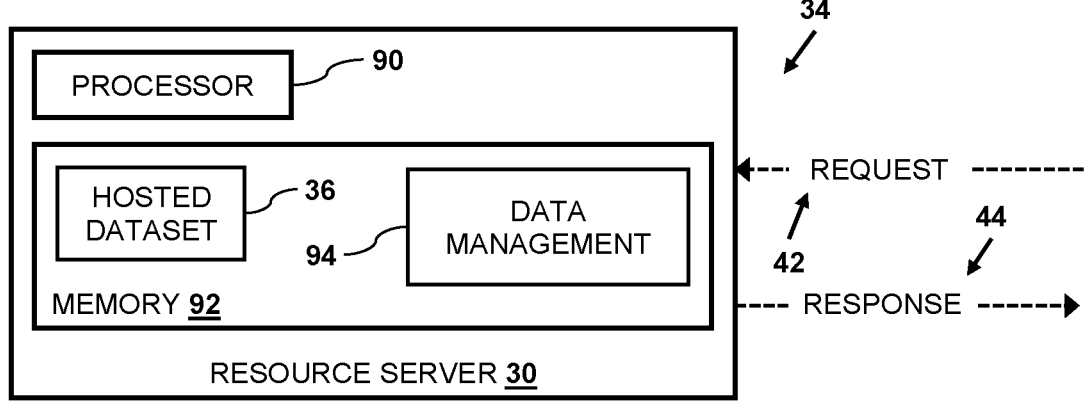
FIG. 3
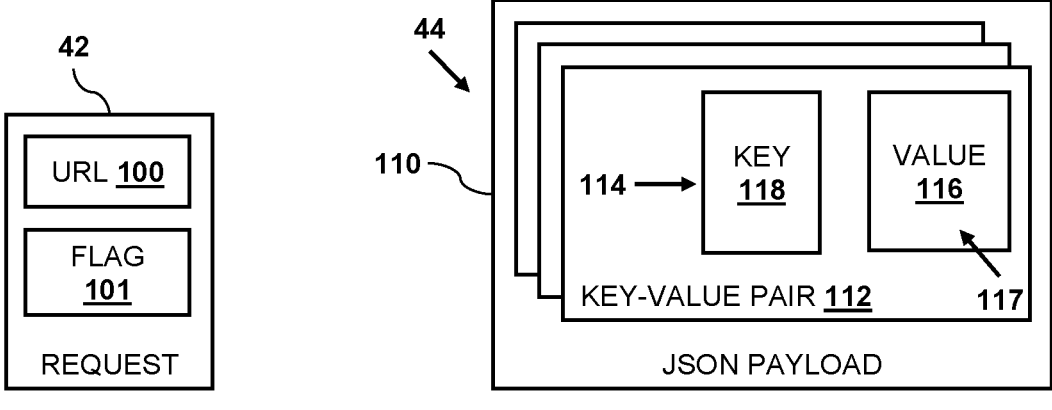
FIG. 4         FIG. 5

| KEY-VALUE PAIR | JSON MAPPING | KEY | VALUE |
|---|---|---|---|
| 'email': 'john@abcxyz.com' | value[].email | email | john@abcxyz.com |
| 'first_name': 'John' | value[].first_name | first_name | John |
| 'last_name': 'Smith' | value[].last_name | last_name | Smith |
| 'username': 'john@abcxyz.com' | value[].username | username | john@abcxyz.com |
| 'email': 'jane@abcxyz.com' | value[].email | email | jane@abcxyz.com |
| 'first_name': 'Jane' | value[].first_name | first_name | Jane |
| 'last_name': 'Doe' | value[].last_name | last_name | Doe |
| 'username': 'jane@abcxyz.com' | value[].username | username | jane@abcxyz.com |

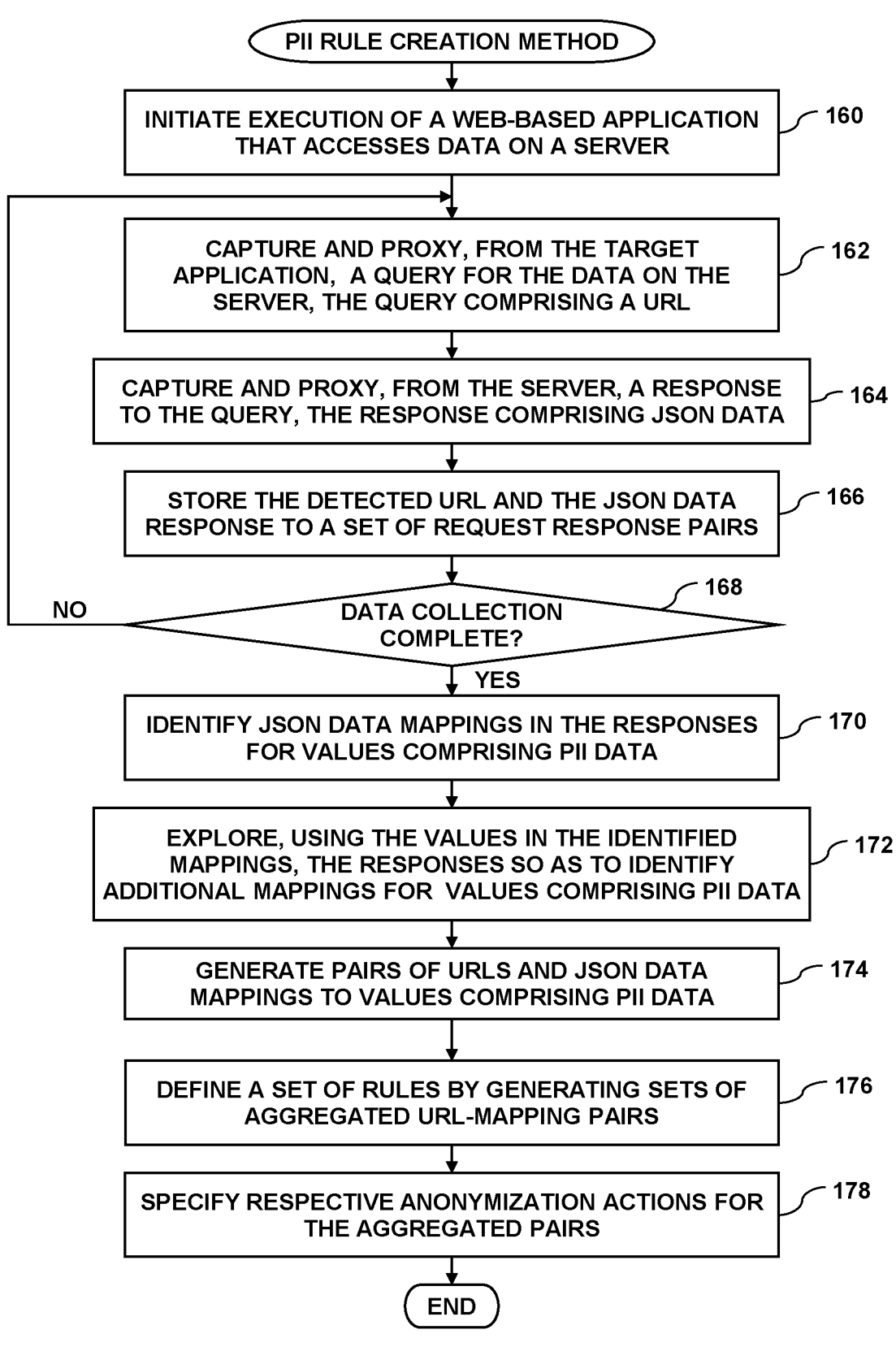

PII RULE CREATION METHOD

INITIATE EXECUTION OF A WEB-BASED APPLICATION THAT ACCESSES DATA ON A SERVER — 160

CAPTURE AND PROXY, FROM THE TARGET APPLICATION, A QUERY FOR THE DATA ON THE SERVER, THE QUERY COMPRISING A URL — 162

CAPTURE AND PROXY, FROM THE SERVER, A RESPONSE TO THE QUERY, THE RESPONSE COMPRISING JSON DATA — 164

STORE THE DETECTED URL AND THE JSON DATA RESPONSE TO A SET OF REQUEST RESPONSE PAIRS — 166

DATA COLLECTION COMPLETE? — 168

NO

YES

IDENTIFY JSON DATA MAPPINGS IN THE RESPONSES FOR VALUES COMPRISING PII DATA — 170

EXPLORE, USING THE VALUES IN THE IDENTIFIED MAPPINGS, THE RESPONSES SO AS TO IDENTIFY ADDITIONAL MAPPINGS FOR VALUES COMPRISING PII DATA — 172

GENERATE PAIRS OF URLS AND JSON DATA MAPPINGS TO VALUES COMPRISING PII DATA — 174

DEFINE A SET OF RULES BY GENERATING SETS OF AGGREGATED URL-MAPPING PAIRS — 176

SPECIFY RESPECTIVE ANONYMIZATION ACTIONS FOR THE AGGREGATED PAIRS — 178

END

FIG. 8

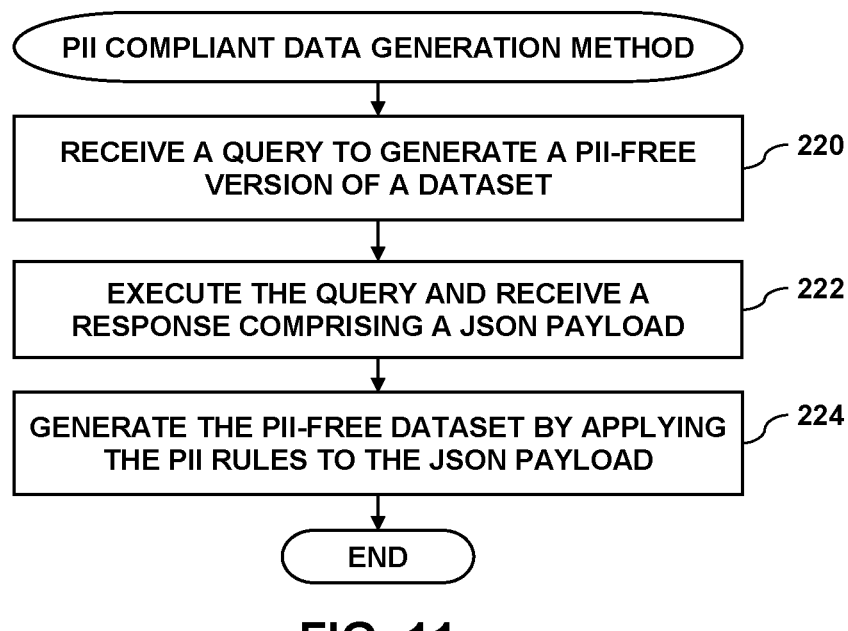

PII COMPLIANT DATA GENERATION METHOD

RECEIVE A QUERY TO GENERATE A PII-FREE VERSION OF A DATASET — 220

EXECUTE THE QUERY AND RECEIVE A RESPONSE COMPRISING A JSON PAYLOAD — 222

GENERATE THE PII-FREE DATASET BY APPLYING THE PII RULES TO THE JSON PAYLOAD — 224

END

FIG. 11

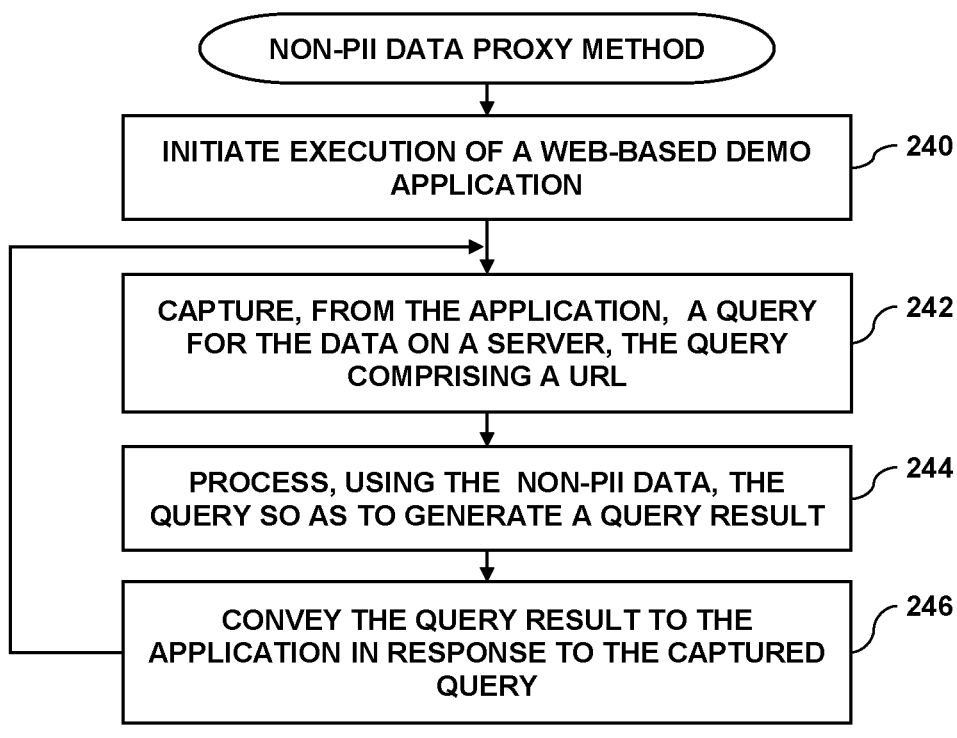

NON-PII DATA PROXY METHOD

INITIATE EXECUTION OF A WEB-BASED DEMO APPLICATION — 240

CAPTURE, FROM THE APPLICATION, A QUERY FOR THE DATA ON A SERVER, THE QUERY COMPRISING A URL — 242

PROCESS, USING THE NON-PII DATA, THE QUERY SO AS TO GENERATE A QUERY RESULT — 244

CONVEY THE QUERY RESULT TO THE APPLICATION IN RESPONSE TO THE CAPTURED QUERY — 246

FIG. 13

OBFUSCATION OF PERSONALLY IDENTIFIABLE INFORMATION

FIELD OF THE INVENTION

The present invention relates generally to data security, and specifically to dynamically identifying and obfuscating personal identifiable information when executing a web-based application.

BACKGROUND OF THE INVENTION

Personal Identifiable Information (PII) refers to any data that can be used to identify a specific individual. This can include a person's name, address, phone number, social security number, email address, date of birth, and more. PII is often collected by organizations for various purposes, such as for employment, healthcare, or financial transactions. One example of PII is Protected Health Information (PHI), which includes information such as medical records, lab reports, hospital bills and any information relating to an individual's past, present, or future physical or mental health. In other words, PHI is a subset of PII.

The collection and use of PII can also pose significant privacy and security risks if not handled appropriately. As such, it is important for individuals and organizations to take appropriate measures to protect PII and ensure its safe handling, storage, and disposal.

PII regulations are laws and guidelines that aim to protect the privacy and security of personal information. These regulations typically require organizations to implement specific measures to ensure the proper handling, storage, and disposal of PII. Some common PII regulations include the General Data Protection Regulation (GDPR) in the European Union, the Health Insurance Portability and Accountability Act (HIPAA) in the United States, and the Personal Information Protection and Electronic Documents Act (PIPEDA) in Canada. Failure to comply with PII regulations can result in significant penalties and legal consequences. As such, it is important for organizations to understand and comply with the relevant regulations in their jurisdiction.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for processing data, including defining a set of rules for protecting sensitive data, each of the rules including a reference Uniform Resource Locator (URL) and a reference JavaScript Object Notation (JSON) data mapping to an item of the sensitive data in a JSON payload, receiving by a proxy, from a software application executing on a host computer, a query including a URL for data hosted by a server, forwarding the received URL from the proxy to the server, receiving at the proxy, from the server, a response to the forwarded URL, the response including a set of values stored in respective JSON data mappings, comparing the received URL and the JSON data mappings in the response to the set of rules, and upon detecting a match between a given rule and a combination including the received URL and a given JSON data mapping in the response, anonymizing, by the proxy, the value stored at the given JSON data mapping in the response, and forwarding the response, including the anonymized value, to the software application.

In one embodiment, the sensitive data includes Personal Identifiable Information (PII).

In some embodiments, the PII includes Protected Health Information (PHI).

In another embodiment, the software application includes a demonstration application for a target application that manages the data on the server.

In an additional embodiment, wherein the query includes a Hypertext Transfer Protocol (HTTP) request, and wherein the response includes an HTTP response including the JSON payload including the values stored in the respective JSON data mappings.

In a further embodiment, the sensitive data includes a first dataset, and the method further includes storing the updated response to a second dataset, wherein the second dataset includes a sensitive data-free version of the first dataset.

In some embodiments, the method further includes subsequent to storing the updated response to the second dataset, receiving, by the proxy from the software application, an additional query including the URL for the data hosted by a server, retrieving the requested data from the second dataset, and conveying, to the software application in response to the additional query, the data retrieved from the second dataset.

In a supplemental embodiment, the query includes a production query, wherein the received URL includes a production URL, wherein the response includes a production response, wherein the JSON data mapping in the response includes a production JSON data mapping, wherein the values include production values, and wherein defining a given rule includes conveying, prior to receiving the production query, a reference query including a given reference URL, receiving from the server, a reference response to the forwarded reference URL, the reference response including a set of reference values stored in respective reference JSON data mappings, identifying a given reference value including sensitive data, and storing the reference URL and the reference JSON data mapping for the identified given reference value to the given rule.

In some embodiments, detecting a match between the a given rule and a combination including the received production URL and the given production JSON data mapping in the production response includes detecting a match between the production URL and the reference URL in the given rule, and detecting a match between the production JSON data mapping in the response and the reference JSON data mapping in the given rule.

In additional embodiments, defining the given rule further includes defining an anonymization operation, and storing the anonymization operation to the given rule.

In further embodiments, anonymizing the value stored at the given production JSON data mapping in the production response includes the performing the anonymization operation in the given rule on the production value stored at the given production JSON data mapping in the production response.

In supplemental embodiments, identifying the reference value including sensitive data includes identifying a format of the reference value, comparing the identified format to a list of specified formats, and detecting a match between the identified format and a given specified format.

In some embodiments, the reference JSON data mapping includes a first reference JSON data mapping, and the method further includes detecting an additional instance of the given reference value in the reference responses, identifying a second reference JSON data mapping for the additional instance the given reference value, and storing the reference URL and the second reference JSON data mapping to an additional rule.

In additional embodiments, identifying the reference value including sensitive data includes comparing the reference values to a list of keywords, and detecting a match between the reference value and a given keyword.

In further embodiments, each of the reference values in the reference responses include respective keys, and wherein identifying the reference value including sensitive data includes comparing the key corresponding to the reference value to a list of keywords, and detecting a match between the corresponding key and a given keyword.

In supplemental embodiments, identifying the reference value including sensitive data includes comparing the reference URL to a list of keywords, and detecting a match between the corresponding key and a given keyword.

In one embodiment, a given reference URL includes one or more wildcard characters.

There is also provided, in accordance with an embodiment of the present invention, an apparatus for processing data, including a memory configured to store a proxy, and one or more processors configured to define, in the memory, a set of rules for protecting sensitive data, each of the rules including a reference Uniform Resource Locator (URL) and a reference JavaScript Object Notation (JSON) data mapping to an item of the sensitive data in a JSON payload, to receive by a proxy, from a software application executing on a host computer, a query including a URL for data hosted by a server, to forward the received URL from the proxy to the server, to receive at the proxy, from the server, a response to the forwarded URL, the response including a set of values stored in respective JSON data mappings, to compare the received URL and the JSON data mappings in the response to the set of rules, and upon detecting a match between a given rule and a combination including the received URL and a given JSON data mapping in the response, to anonymize, by the proxy, the value stored at the given JSON data mapping in the response, and to forward the response, including the anonymized value, to the software application.

There is additionally provided, in accordance with an embodiment of the present invention a computer software product for demonstrating a target application, including a non-transitory computer-readable medium, in which program instructions are stored, which instructions, when read by a computer, cause the computer to define a set of rules for protecting sensitive data, each of the rules including a reference Uniform Resource Locator (URL) and a reference JavaScript Object Notation (JSON) data mapping to an item of the sensitive data in a JSON payload, to receive by a proxy, from a software application executing on a host computer, a query including a URL for data hosted by a server, to forward the received URL from the proxy to the server, to receive at the proxy, from the server, a response to the forwarded URL, the response including a set of values stored in respective JSON data mappings, to compare the received URL and the JSON data mappings in the response to the set of rules, and upon detecting a match between a given rule and a combination including the received URL and a given JSON data mapping in the response, to anonymize, by the proxy, the value stored at the given JSON data mapping in the response, and to forward the response, including the anonymized value, to the software application.

BRIEF DESCRIPTION OF THE DRAWINGS

The disclosure is herein described, by way of example only, with reference to the accompanying drawings, wherein:

FIG. 2 is a block diagram that shows hardware and software components of a host computer in the computing facility, in accordance with an embodiment of the present invention;

FIG. 3 is a block diagram that shows hardware and software components of the resource server, in accordance with an embodiment of the present invention;

FIG. 4 is a block diagram showing a query generated by the host computer for data stored on the resource server, in accordance with an embodiment of the present invention;

FIG. 5 is a block diagram showing components of a response comprising a JavaScript Object Notation (JSON) payload that was generated by the resource server in response to processing the query, in accordance with an embodiment of the present invention;

FIG. 6 is a table showing an example of components of a given JavaScript Object Notation (JSON) payload, in accordance with an embodiment of the present invention;

FIG. 8 is a flow diagram that schematically illustrates a method of generating PII rules that the PII obfuscation server can use to anonymize PII data retrieved from the resource server in real-time, in accordance with an embodiment of the present invention;

FIG. 11 is a flow diagram that schematically illustrates a method of applying the PII rules to a dataset comprising PII data so as to generate a PII-free copy of the dataset, in accordance with an embodiment of the present invention;

FIG. 13 is a flow diagram that schematically illustrates a method of proxying data requests to the PII-free copy of the dataset, in accordance with an embodiment of the present invention.

DETAILED DESCRIPTION OF EMBODIMENTS

Demonstrating a software application that accesses sensitive data such as Personal Identifiable Information (PII) data poses several challenges, particularly around ensuring privacy, security, and compliance with data protection laws. Embodiments of the present invention provide methods and systems for protecting a hosted dataset that comprises PII data and is stored on a server. In embodiments herein, PII may also be referred to as sensitive data, and may include other types of sensitive data such as Protected Health Information (PHI). Additionally, protecting a dataset using embodiments described herein is also known as sanitizing the dataset.

In a first embodiment described hereinbelow, a set of rules for protecting sensitive data are defined, each of the rules comprising a reference Uniform Resource Locator (URL) and a reference JavaScript Object Notation (JSON) data mapping to an item of the sensitive data in a JSON payload. In this embodiment, a proxy receives, from a software application executing on a host computer, a query comprising a URL for data hosted by a server, the proxy forwards the received URL to the server. In response to the forwarded proxy, the proxy receives, from the server, a response to the forwarded URL, the response comprising a set of values stored in respective JSON data mappings in a given JSON payload 110.

The proxy compares the received URL and the JSON data mappings in the received response to the set of rules, and upon a match being detected between a given rule and a combination comprising the received URL and a given JSON data mapping in the response, the proxy anonymizes the value stored at the given JSON data mapping in the response. Finally, the response, including the anonymized value, is forwarded to the software application (i.e., as a response to the received query).

In embodiments described herein, anonymizing the (sensitive) value may comprise decommissioning value by performing operations such as replacing the sensitive value with a (previously) generated safe value, or replacing the sensitive value with a placeholder such as "***" (i.e., non-text data).

Embodiments described herein can be used to ensure compliance with PII regulations when demonstrating the software application. In the first embodiment, data queries from the software application can be proxied to a server that is configured to:

Retrieve, from the hosted dataset, the data requested by the query.

Apply the defined rules to the retrieved data so as to identify PII data.

Anonymize the identified data.

Generate, for the query, a response comprising the anonymized data.

Convey, the generated response to the software application.

In a second embodiment described hereinbelow, the rules can be applied to the hosted dataset so as to create a PII-free copy of the dataset. In the second embodiment the data queries can be proxied to the server, and the server can execute the query on the PII-free copy of the dataset.

System Description

Figure 1:
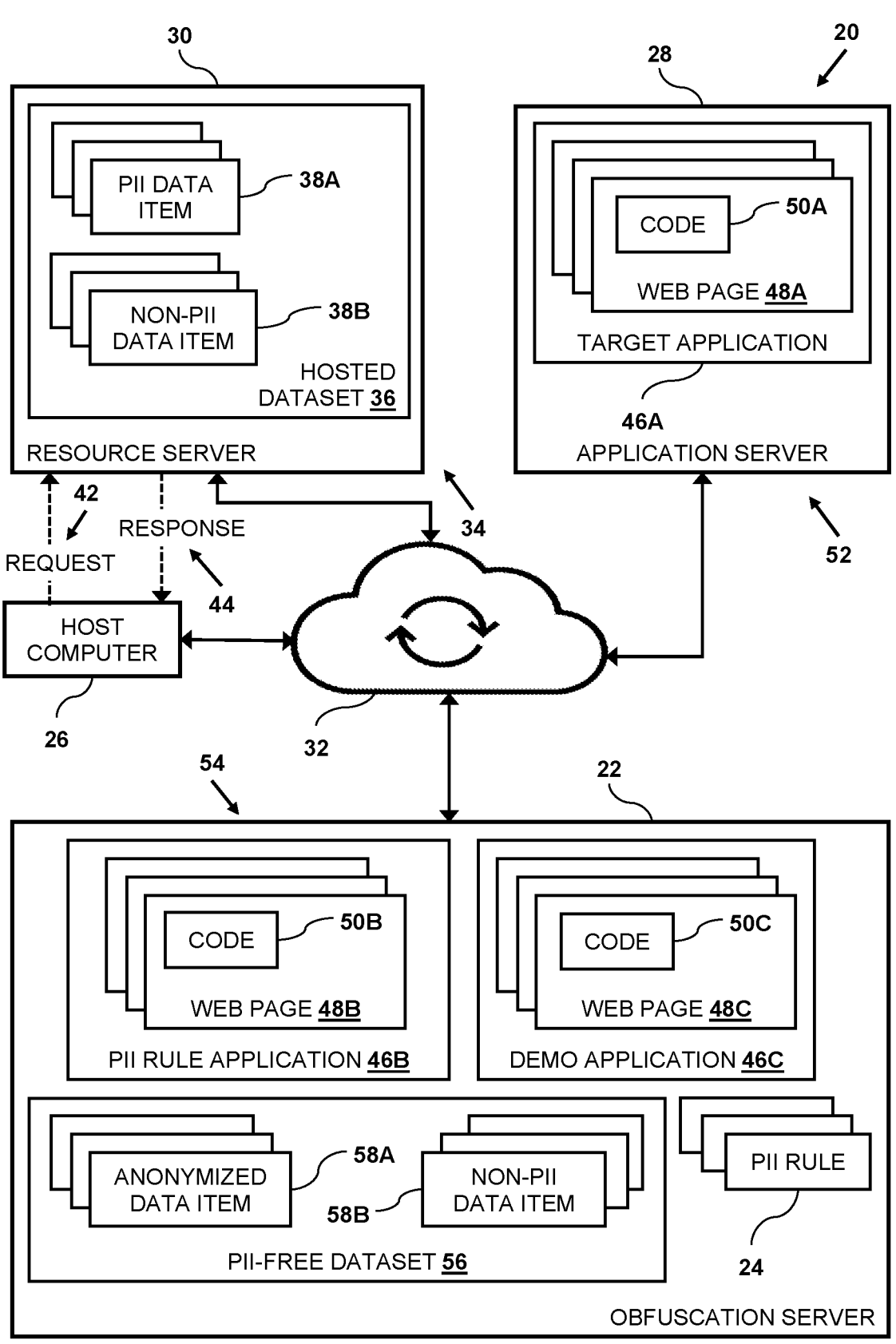
FIG. 1 is a block diagram that schematically shows an example of a computing facility comprising a Personal Identifiable Information (PII) obfuscation server that is configured to dynamically anonymize PII data retrieved from a resource server, in accordance with an embodiment of the present invention.

FIG. 1 is a block diagram that schematically shows an example of a computing facility 20 comprising an obfuscation server 22 that manages a set of Personal Identifiable Information (PII) rules 24, in accordance with an embodiment of the present invention. In addition to obfuscation server 22, computing facility 20 comprises a host computer 26, an application server 28 and a resource server 30. In some embodiments, host computer 26 and servers 22, 28 and 30 are configured to communicate over a public network such as Internet 32.

Resource server 30 can be referenced by a resource domain name 34 and can be configured to manage a hosted dataset 36 (also referred to herein as a first dataset) that comprises hosted data items 38. In embodiments described herein, data items 38 may also be referred to as values and can be differentiated by appending a letter to the identifying numeral, so that the data items comprise PII data items 38A (i.e., sensitive data items) and non-PII data items 38B (i.e., non-sensitive data items). Resource server 30 is further described in the description referencing FIG. 3 hereinbelow.

Host computer 26 is configured to convey, via Internet 32, requests 42 to resource server 30, and to receive, from resource server via the Internet, responses 44 to the queries. In embodiments described herein, requests 42 may comprise queries to retrieve data item(s) 38. In embodiments herein, requests 42 may also be referred to as queries 42.

In additional embodiments requests 42 may comprise Hypertext Transfer Protocol (HTTP) requests, and responses 44 may comprise HTTP responses. Additional details of host computer 26, requests 42 and responses 44 are respectively described in the descriptions referencing FIGS. 2, 4 and 5 hereinbelow.

In some embodiments, application server 28 and obfuscation server 22 are configured to host web-based software applications 46 that comprise respective sets of web pages 48. Each web page 46 comprises browser executable code 50 such as (one or more of) HyperText Markup Language (HTML), JavaScript and/or Cascading Style Sheets (CSS).

In embodiments described herein, software applications 46, web pages 48 and code 50 can be differentiated by appending a letter to the identifying numeral, so that the software applications comprise target application 46A comprising web pages 48A and code 50A, PII rule application 46B comprising web pages 48B and code 50B, and demo application 46C comprising web pages 48C and code 50C.

Application server 28 can be referenced by an application domain name 52, and hosts target application 46A that is typically a production application configured to access hosted dataset 36.

Obfuscation server 22 can be referenced by an obfuscation domain name 54, and in addition to hosting applications 46B and 46C, the obfuscation server is configured to store PII rules 24. In embodiments described herein, PII rule application 46B is configured to manage PII rules 34. Obfuscation server 22 and PII rules 24 are further described in the description referencing FIG. 7 hereinbelow.

In some embodiments, obfuscation server 22 can be configured to host demo application 46C that comprises a demonstration version of target application 46A.

In additional embodiments, obfuscation server 22 can be configured to host a PII-free dataset 56 (also referred to herein as a second dataset or a sensitive data-free dataset) that is a PII-free version of hosted dataset 36. PII-free dataset 56 comprises PII-free data items 58. In embodiments described herein, data items can be differentiated by appending a letter to the identifying numeral, so that the data items comprise:

Anonymized data items 58A that comprise PII-free versions of all or a subset of PII data items 38A. In embodiments herein a PII-free version of a given PII data item 38A comprises masked data, changed data (e.g., replace a given last name with a fake last name), scrambled data or "blanked" (i.e., deleted) data.

Non-PII data items 58B that comprise a copy of all or a subset of non-PII data items 38B.

FIG. 2 is a block diagram showing an example of hardware and software components of host computer 26 that can be operated by a user 70, in accordance with an embodiment of the present invention. In the configuration shown in FIG. 2, host computer 26 comprises a host processor 72, a host memory 74, a display 76, and an input device such as a keyboard 78.

Memory 74 may comprise a web browser application 80 such as CHROME™ (produced by Alphabet Inc., Mountain View, CA, USA). In a first host embodiment, memory 74 may also comprise a web extension 82 (i.e., for browser 80) that is configured to proxy requests 42 to obfuscation server 22. In a second host embodiment, web browser 80 may comprise a custom browser that is configured to proxy the requests to the obfuscation server.

In operation, processor 72 can execute, from memory 74, browser 80 that can download a given web page 48, and then execute the browser executable code in the given web page so as to (a) render, on display 76, an application screen 84, and (b) generate one or more requests 42. In the host embodiment described supra, browser 80 (or browser 80 executing extension 82) can proxy, to obfuscation server 22, the generated requests.

FIG. 3 is a block diagram showing an example of hardware and software components of resource server 30, in accordance with an embodiment of the present invention. In the configuration shown in FIG. 3, resource server 30 comprises a resource processor 90 and a resource memory 92 that stores hosted dataset 36 and a data management application 94 that the resource processor can execute so as to manage the hosted dataset. In some embodiments data management application 94 is configured to receive requests 42 (i.e., queries) for hosted dataset 36 and execute the requests so as to generate responses 44.

FIG. 4 is a block diagram showing an example of a given request 42 generated by host computer 26, in accordance with a mobile embodiment of the present invention. In embodiments herein, request 42 comprises a Uniform Resource Locator (URL) 100. As described supra, requests 42 may comprise data queries or requests for web pages 48. The following is an example of a given URL 100 for a data query:

www.demoapp.com/api/organizations/self

In some embodiments, a given request 42 may comprise a flag 101. Flag 1101 is described in the descriptions referencing FIGS. 10 and 12 hereinbelow.

FIG. 5 is a block diagram showing data components of a given response 44 generated by resource server 30 in response to processing a given request 42, in accordance with a mobile embodiment of the present invention. In embodiments herein, HTTP responses 44 may comprise a JavaScript Object Notation (JSON) payload 110. Since embodiments of the present invention analyze JSON payloads 110, HTTP responses 44 in embodiments described hereinbelow typically comprise the HTTP responses comprising JSON payloads 110.

In the configuration shown in FIG. 5, JSON payload 110 comprises a set of JSON key-value pairs 112, each of the JSON key-value pairs comprising a key 118 (i.e., a name identifier) and a value 116 having a (i.e., stored using) a value format 117. In embodiments described herein, each the JSON key-value pairs comprises (i.e., can be referenced by) a JSON data mapping 114. The following is an example a given JSON key-value pair 112:

data mapping 114=value[ ].email
    value 116=john@abcxyz.com
    value format 117=******@example.com
    key 118=email Additionally, using embodiments described hereinbelow, obfuscation server 22 can apply rules 24 to values 116 so as to classify each value 116 as either sensitive data (e.g., PII) or non-sensitive data (e.g., non-PII).

JSON data mappings 114 indicate respective "paths" to values 116 in JSON payloads 110 (i.e., locations of the values in the JSON payloads). Using the example described supra, processor 120 can use the mapping value[ ].email to locate the JSON key-value pair storing email: john@abcxyz.com by identifying the values in the JSON payload, storing the values to an array (not shown), and iterate through the members of the array by using the key email so as to locate the value John@abcxyz.com.

Note that data mapping 114 typically includes key 118. In embodiments described hereinbelow, obfuscation server 22 can classify each given value 116 as either a PII or non-PII (i.e., any value 116 that the obfuscation server did not classify as PII can be assumed to be non-PII). In these embodiments, a given PII data item 38A refers to a given value 116 that obfuscation server 22 classified as sensitive data (e.g., PII), and a given non-PII data item 38B refers to a given value 116 that the obfuscation server classified as non-sensitive data (e.g., non-PII).

FIG. 6 shows an example of a table 102 storing key-value pairs 112, data mappings 114, values 116 and keys 118 from a given JSON payload 110, in accordance with an embodiment of the present invention. In the example shown in FIG. 6, the JSON payload comprises:

```
{'status': 0,
  'substatus': 0,
  'value': [{'created_at': '2022-03-20T01:28:15',
    'email': 'john@abcxyz.com',
    'first_name': 'John',
    'last_name': 'Smith',
    'username': 'john@abcxyz.com'},
    {'created_at': '2022-01-14T13:15:21',
    'email': 'jane@abcxyz.com',
    'first_name': 'Jane',
    'last_name': 'Doe',
    'username': 'jane@abcxyz.com'}]}
```

Additionally, in the example shown in FIG. 6, JSON key-value pairs 112 and their respective data components can be differentiated by appending a letter to the identifying numeral, so that the key-value pairs comprise JSON key-value pairs 112A-112H, the data mappings comprise data mappings 114A-114H, the values comprise values 116A-116H, the value formats comprise value formats 117A-117H, and the keys comprise keys 118A-118H.

In FIG. 6:

JSON key-value pair 112A comprises JSON data mapping 114A and value 116A. JSON data mapping 114A comprises key 118A.

JSON key-value pair 112B comprises JSON data mapping 114B and value 116B. JSON data mapping 114B comprises key 118B.

JSON key-value pair 112C comprises JSON data mapping 114C and value 116C. JSON data mapping 114C comprises key 118C.

JSON key-value pair 112D comprises JSON data mapping 114D and value 116D. JSON data mapping 114D comprises key 118D.

JSON key-value pair 112E comprises JSON data mapping 114E and value 116E. JSON data mapping 114E comprises key 118E.

JSON key-value pair 112F comprises JSON data mapping 114F and value 116F. JSON data mapping 114F comprises key 118F.

JSON key-value pair 112G comprises JSON data mapping 114G and value 116G. JSON data mapping 114G comprises key 118G.

JSON key-value pair 112H comprises JSON data mapping 114H and value 116H. JSON data mapping 114H comprises key 118H.

JSON data mappings 114A and 114E both reference value[ ].email.

JSON data mappings 114B and 114F both reference value[ ].first_name.

JSON data mappings 114C and 114G both reference value[ ].last_name.

JSON data mappings 114D and 114F both reference value[ ].username.

Keys 118A and 118E both reference email.

Keys 118B and 118F both reference first_name.

Keys 118C and 118G both reference last_name.

Keys 118D and 118H both reference username.

Values 116A and 116D both reference john@abcxyz.com.

Value 116B references John.

Value 116C references Smith.

Value 116D and 116H both reference jane@abcxyz.com.

Value 116A references Jane.

Value 116A references Doe.

Figure 7:
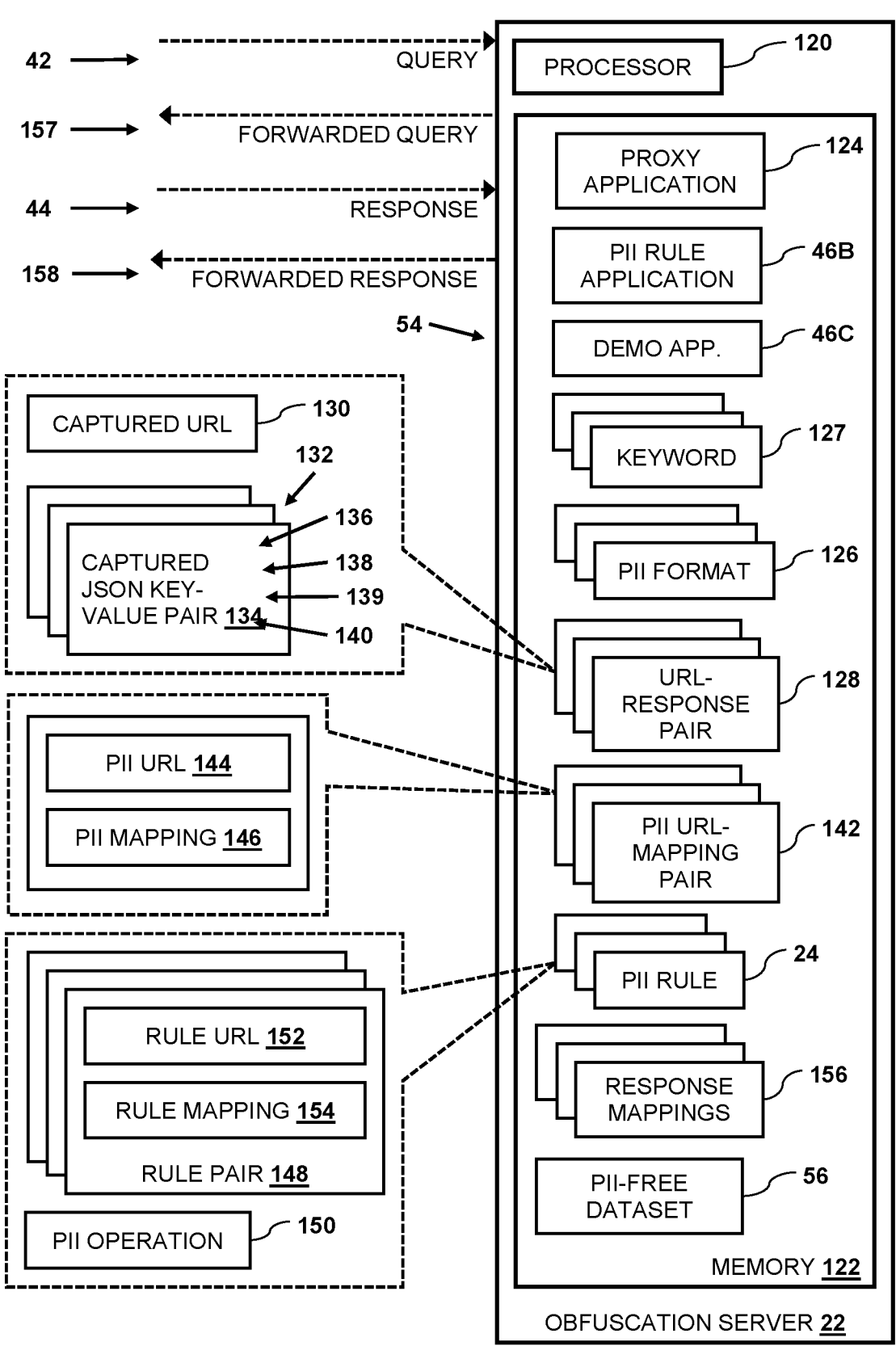
FIG. 7 is a block diagram that schematically shows hardware and software components of the PII obfuscation server, in accordance with an embodiment of the present invention.

FIG. 7 is a block diagram that schematically shows hardware and software components of obfuscation server 22, in accordance with an embodiment of the present invention. Obfuscation server 22 may comprise an obfuscation processor 120 and an obfuscation memory 122 that can store:

A proxy application 124. In some embodiments, processor 120 can execute proxy application 124 so as to receive, from host computer 26, a given query 42, convey the received request to resource server 30 as a forwarded query 157, receive a given response 44 from the resource server in response to the forwarded query, and forward the received response to the host computer as a forwarded response 158. Additional functionality of proxy application 124 is described hereinbelow.

PII rule application 46B. In embodiments herein, application 46B comprises a web-based application. As described hereinbelow, web browser 80 can execute application 46B so as to define and manage PII rules 24.

Demo application 46C. In embodiments herein, application 46B comprises a web-based application. Web browser 80 can execute application 46C to demonstrate target application 46A. Typically demo application 46B comprises a restricted clone of target application 46A, as described supra. Techniques for generating demo application 46C from target application 46A are described in U.S. Patent Applications 2023/0114651, Ser. Nos. 17/746,981 and 18/176,499, whose disclosures are incorporated herein by reference.

A set of specified PII formats 126 that processor 120 can use to identify values 116 that are PII data items 38A. Examples of formats 126 include, but are not limited to:

*****@example.com (a format for an email address)

(555) 555 5555 (a format for a phone number)

123-45-6789 (a format for a Social Security number)

AL35202111090000000001234567 (a format for an International Bank Account Number, i.e., an IBAN)

1111-1111-1111-111 (a format for a credit card)

Detecting 1-3 or space breaks in text can indicate a name. For example, the text string "Mr. Bob Alan" comprises a title, followed by a space, followed by a first name, followed by a space, followed by a last name.

Using the example described in the description referencing FIG. 6 hereinabove, processor 120 can classify values 116E and 116H as PII data items 38A by comparing those values to PII formats 126 and detecting that formats 117E and 117H match a given PII format 126 (e.g., *****@example.com described supra).

A set of keywords 127. As described in the description referencing FIG. 8 hereinbelow, processor 120 can detect PII data items 38A by comparing keywords 127 for to URLs 100, keys 118 and values 116.

Using the example described in the description referencing FIG. 6 hereinabove, processor 120 can classify values 116B, 116C, 116F and 116G as PII data items 38A by comparing those values to keywords 127 and detecting that values 116B and 116F match keywords 127 for first names (i.e., John and Jane), and detecting that values 116C and 116G match keywords 127 for last names (i.e., Smith and Doe). Alternatively, processor 120 can classify values 116B, 116C, 116F and 116G as PII data items 38A by comparing those values to keywords 127 and detecting that keys 118B, 118C, 118F and 118G (i.e., first_name, last_name) all contain (i.e., match) a given keyword 127 comprising "name".

A set of URL-response pairs 128. Each URL-response pair comprises a captured URL 130 (also referred to herein as reference URL 130) and a captured JSON payload 132 that comprises a set of captured JSON data element 134. Each captured JSON data element 134 comprises a captured JSON data mapping 136 (also referred to herein as reference JSON data mapping 136), a captured value 138 (also referred to herein as reference value 138) having a captured format 139, and a captured key 140. Usage of pairs 128 is described in the descriptions referencing FIGS. 8 and 9 hereinbelow.

A set of PII URL-mapping pairs 142. Each PII URL-mapping pair 142 comprises a PII URL 144 and a PII mapping 146. Usage of pairs 142 is described in the description referencing FIGS. 8 and 9 hereinbelow.

Rules 24. Each rule 24 comprises a rule pair 148 and an operation 150. Each rule pair 148 comprises a rule URL 152 and a rule data mapping 154. Usage of pairs 148 is described in the description referencing FIGS. 8 and 9 hereinbelow.

Each operation 150 indicates an action to be performed on a given PII data item 38A. Examples of operations 150 processor 120 can perform on a given PII data item 38A include, but are not limited to, deleting the given PII data item 38A, masking (e.g., scrambling) the given PII data item 38A, and replacing the given PII data item 38A with benign generic values (e.g., change a phone number to (111) 222-3333.

PII-free dataset 56. As described supra, PII-free dataset 56 comprises a version of hosted dataset 36 that does not comprise any PII data items 38A.

A set of response data mappings 156. Response data mappings 156 are described in the description referencing FIG. 9 hereinbelow.

Processors 72, 90 and 120 comprise general-purpose central processing units (CPU) or special-purpose embedded processors, which are programmed in software or firmware to carry out the functions described herein. This software may be downloaded to obfuscation server 22, host computer 26 or resource server 30 in electronic form, over a network, for example. Additionally or alternatively, the software may be stored on tangible, non-transitory computer-readable media, such as optical, magnetic, or electronic memory media. Further additionally or alternatively, at least some of the functions of processors 72, 90 and 120 may be carried out by hard-wired or programmable digital logic circuits.

Examples of memories 74, 92 and 122 include dynamic random-access memories, non-volatile random-access memories, hard disk drives and solid-state disk drives.

In some embodiments, tasks described herein performed by host computer 26 and servers 22, 28, 30 may be split among multiple physical and/or virtual computing devices such as physical and/or virtual servers. In other embodiments, these tasks may be performed by a managed cloud service.

PII Rule Definition

Figure 9:
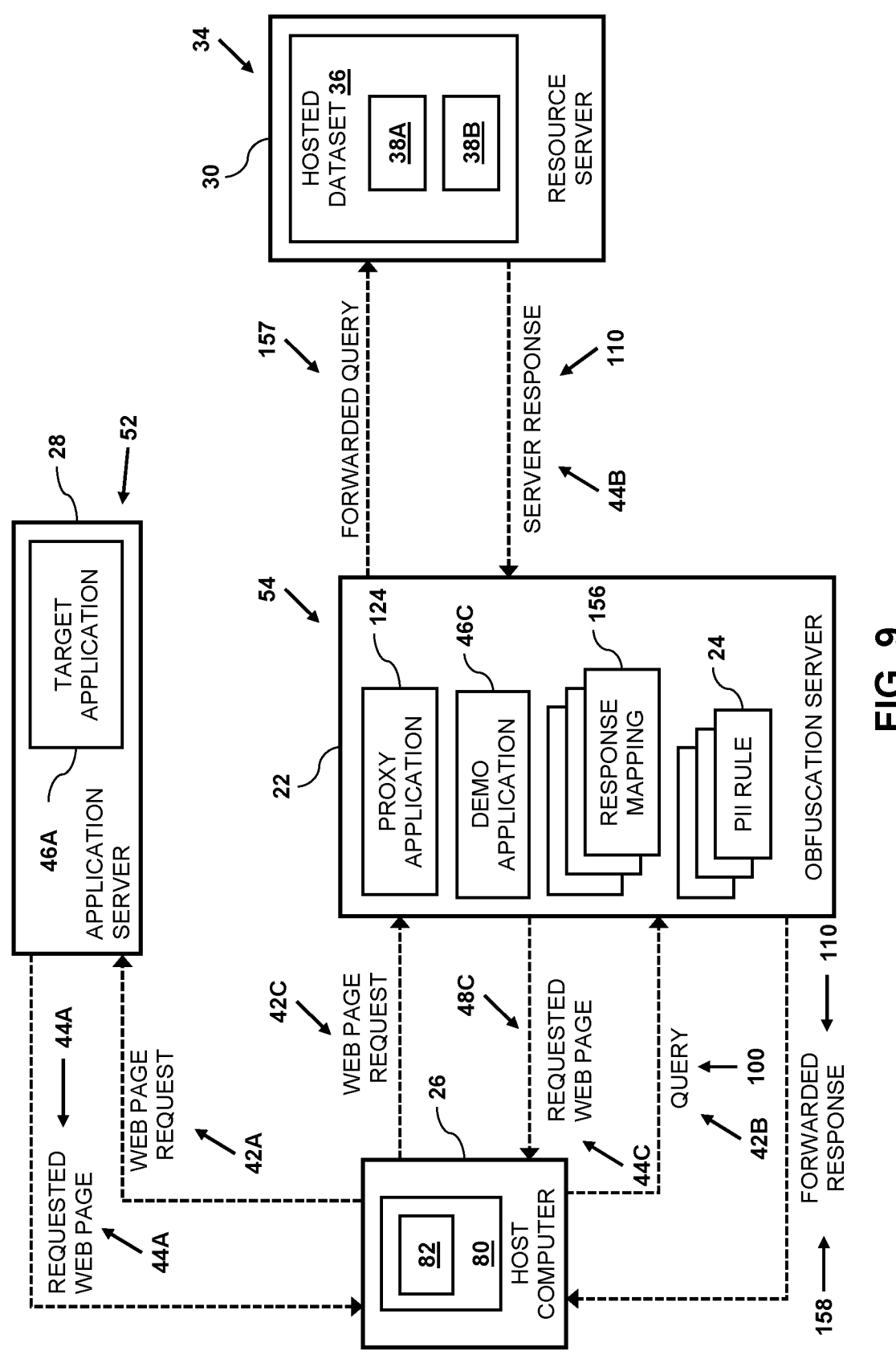
FIG. 9 is a block diagram that schematically illustrates the PII obfuscation server communicating with the host computer and the resource server, in accordance with an embodiment of the present invention.

FIG. 8 is a flow diagram that schematically illustrates a method for defining PII rules 24, and FIG. 9 is a block diagram showing (a) obfuscation server 22 communicating with host computer 26 and resource server 30, and (b) the host computer communicating with application server 28, in accordance with an embodiment of the present invention. In embodiments described in the descriptions referencing FIGS. 9-13 hereinbelow, requests 42 and responses 44 can be differentiated by appending a letter to the identifying numeral, so that the requests comprise web page request 42A, query 42B web page request 42C, and dataset creation query 42D, and the responses comprise responses 44A-44D.

In step 160, browser 80 (executing on host computer 26) initiates execution of a given application 46. To execute the given application:

In a first application embodiment, browser 80 conveys, to application server 28 executing target application 46A, request 42A for a given web page 48A, and in response to receiving request 42A, the application server conveys the requested web page to host computer 26 in response 44A.

In a second application embodiment, browser 80 conveys, to obfuscation server 22 executing demo application 46C, request 42C for a given web page 48C, and in response to receiving request 42C, the obfuscation server conveys the requested web page to host computer 26 in response 44C.

Upon receiving the requested web page, browser 80 executes the browser executable code in the received web page.

In step 162, browser executable code 50A (executing in browser 80) generates query 42B for one or more hosted data items 38 stored on resource server 30. As described supra, query 42B comprises a given URL 100. While performing step 162, query 42B may also be referred to herein as reference query 42B.

In the first application embodiment described supra, browser 80 generates query 42B while executing browser executable code 50A in the given web page 48A, and proxies (i.e., redirects via browser extension 82) query 42B (i.e., originally directed to resource server 30) to obfuscation server 22. In the second application embodiment described supra, browser 80 generates query 42B while executing browser executable code 50C in the given web page 48CA, and conveys query 42B to obfuscation server 22.

Upon receiving query 42B (i.e., in both the first and the second application embodiments), proxy application 124 forwards the received query to resource server 30 as a forwarded query 157.

Upon receiving forwarded query 157, resource server 30 processes the forwarded query by retrieving the requested data item(s) 38, generating a new JSON payload 110 comprising the retrieved data item(s) and conveys the new JSON payload to obfuscation server 22 in response 44B.

In step 164, proxy application 124 receives response 44B comprising the new JSON payload, and proxies response 44B by forwarding the new JSON payload to host computer 26 in forwarded response 158. While performing step 164, response 44B may also be referred to herein as reference response 44B.

In step 166, for each proxy application 124 generates, in memory 122, a new URL-response pair 128, stores the URL in received query 42B to captured URL 130 in the new URL-response pair, and stores the JSON payload in response 44B to captured JSON payload 132 in the new URL-response pair. Upon storing the JSON payload in response 44B to captured JSON payload 132 in the new URL-response pair, data mappings 114, values 116, formats 117 and keys 118 have respective one-to-one correspondences with data mappings 136, values 138, formats 139 and keys 140.

In step 168, if data collection (i.e., steps 162-166) is not complete, then the method continues with step 162. While performing steps 162-166, the received query may be referred to herein as a rule query, the received URL may be referred to herein as a rule URL, and the response may be referred to herein as a rule response.

However, if the data collection is complete, then in step 170, processor 120 identifies, in captured JSON payloads 132, values 138 comprising PII data items 38A, and identifies respective data mappings 136 for the identified values. In a first identification embodiment, processor can identify a given PII value 38A by comparing value formats 139 to PII formats 126, and classifying any values 138 whose respective value format 139 matches a given PII format 126 as a given PII data item 38A. In other words, a given PII data item 38A comprises a given value 138 whose respective value format 117 matches a given PII format 126.

In a second identification embodiment, while executing PII rule application 46B (i.e., as a web-based application) on host computer, 26, the PII rule application can present, in application screen 84 on display 76, one or more values 138, and receive an input from user 70 (i.e., from keyboard 78) that classifies one or more of the presented values as given PII data item 38A.

In a third identification embodiment, processor 120 can use keywords 127 for identifying values 138 comprising PII data items 38A.

In a first keyword embodiment, processor 120 can compare captured URLs 130 to keywords 127 and flag a given JSON payload 132 (i.e., as comprising one or more PII data items 38A) upon detecting that the corresponding captured URL 130 (i.e., the captured URL in the same URL-response pair 128 as the given JSON payload). For example, if given a given captured URL 130 comprises "www.demoapp.com/api/organizations/self" and a given keyword 127 comprises "organization", processor 120 can compare the given captured URL to the keywords, and flag the corresponding JSON payload (i.e., as storing one or more PII data items 38A) upon detecting a match (or in this case a partial match) between the given captured URL and the given keyword.

In a second keyword embodiment, processor 120 can compare captured keys 140 to keywords 127 and classify a given captured value 138 as sensitive data (e.g., PII) upon detecting that the corresponding captured key 140 (i.e., the captured key for the captured value) matches a given keyword 127. For example, using data from key-value pairs 112 in the description referencing FIG. 6 hereinabove, if a given keyword 127 comprises "name", then processor 120 can classify a given captured value 138 as sensitive data (i.e., PII) in response to comparing the captured key for the given captured value to keywords 127 and detecting that the captured key for the given captured value matches the given keyword (i.e., if the captured key for the given captured value is "first_name" or "last_name", the processor detects "name" as a substring in the captured key).

In a third keyword embodiment, processor 120 can compare captured values 138 to keywords 127 and classify a given captured value 138 as sensitive data (e.g., PII) upon detecting that the given captured key 140 (i.e., the captured key for the captured value) matches a given keyword 127. For example, using data from key-value pairs 112 in the description referencing FIG. 6 hereinabove, if a given keyword 127 comprises "Jane", then processor 120 can classify a given captured value 138 as sensitive data (i.e., PII) in response to comparing the captured values to keywords 127 and detecting that the given captured value matches the given keyword. Keywords 127 can store text strings for sensitive data such as first names, last names and cities.

In step 172, processor 120 explores, using the PII values identified in step 170, captured JSON payloads 132 so as to identify additional data mappings 136 for values 116 comprising PII data items 38A. To explore captured JSON payloads 132, processor 120 can select one or more values 138 previously classified (e.g., in step 170) as PII data items 38A, and searches the JSON records for additional instances of the selected one or more values. Upon finding an additional instance of a given selected value 138, processor 120 can identify the data mapping for the given selected value. In other words, processor 120 can "crawl" JSON payloads 132 so as to identify additional instances of values 138 previously identified as storing PII data items 38A.

For example, if processor 120 first identifies (i.e., in step 170) "Jones" as a given PII data item 38A stored in the data mapping value[ ].last_name and upon the server processor searches JSON payloads 132 for additional instances of "Jones", and finds an additional instance at the data mapping value.last_name In some embodiments, processor 120 can iterate step 172 multiple times. Using these embodiments, processor 120 can collect additional JSON payloads 110, and thus identify additional PII data items 38A, as described supra. For example, processor 120 might search for "Jones" in the first iteration, and in addition to finding additional data mappings for "Jones", the processor might find a name "Smith" in the data mappings. In the second iteration, processor 120 can search for "Smith", and continue the iterations as necessary.

In step 174, processor 120 generates PII URL-mapping pairs 142 for the PII data items 38A identified in step 172. As described supra, processor 120 identifies sets of data mappings 136 (i.e., data mappings 136 to values 138 comprising PII data items 38A) in captured JSON payloads 132 that have corresponding captured URLs 130 (i.e., each given URL-response pair 128 comprises a given captured URL 130 and a corresponding captured JSON payload 132). In some embodiments, for each given captured data mapping

136 that processor 120 identified in steps 170 and 172, the server processor can add a new PII URL-response pair 142, store the given captured data mapping to PII data mapping 146 in the new PII URL-response pair 142, and store the corresponding captured URL 130 (i.e., corresponding to the given captured data mapping) to PII data mapping 144.

In step 176, processor 120 creates a set of PII-rules 24 by generating, from PII URL-mapping pairs 142, sets of rule pairs 148. In some embodiments, each given rule 24 comprises one or more rule pairs 148 that comprise respective sets of aggregated PII URL-mapping pairs 142.

To generate the sets of rule pairs 148, Processor 120 can first delete any duplicate PII URL-mapping pairs 142 (i.e., containing identical PII URLs 144 and PII mappings 146. Processor 120 can then group together PII URL-mapping pairs 142 so as to generate sets of the aggregated PII URL-data mapping pairs. In some embodiments, processor 120 can group together URL-mapping pairs 142 having identical PII URLs 144, and (a) whose respective PII data mappings 146 reference the same or "similar" keys 140 or (b) whose respective PII data mappings 146 reference values 138 having identical formats 139 (e.g., a phone number).

An example of similar keys 140 that processor 120 can use to group together PII URL-mapping pairs 142 comprises FirstName, first_name, first-name, first.name and fnmame. Using this example, processor 120 can group these two PII URL-mapping pairs 142 so as to include them in a given set of aggregated PII URL-mapping pairs 142:

A first given PII URL-mapping pair 142 comprising:
        PII URL 144=/api/organizations/self
        PII data mapping 146=value[ ].first_name
    A second given PII URL-mapping pair 142 comprising:
        PII URL 144=/api/users/self
        PII data mapping 146=value[ ].first.name In additional embodiments, PII URLs 144 may comprise one or more wildcard characters. Use of the wildcard characters is described in the description referencing step 198 hereinbelow.

For each given set of aggregated PII URL-mapping pairs 142, processor 120 can add a new rule 24, and for each given PII URL-mapping pair 142 in the given set, processor can add a new rule pair 148 to the new rule 24, store PII URL 144 in the given PII URL-mapping pair 142 to rule URL 152 in the new rule pair, and store PII data mapping 146 in the given PII URL-mapping pair 142 to rule data mapping 154. in the new rule pair.

Finally in step 178, processor 120 can specify respective PII operations 150 in rules 24, and the method ends. In some embodiments, while executing PII rule application 46B (i.e., as a web-based application) on host computer, 26, the PII rule application can present, in application screen 84 on display 76, the rule data mappings for a given PII rule 24, and receive an input from user 70 (i.e., from keyboard 78) that selects a given operation (e.g., masking or scrambling) to store to a given PII operation 150.

In other embodiments, processor 120 can be programmed to select a given operation for a given PII operation 150 in a given rule 24. In these embodiments, processor 120 can select the given operation based on format 139 for the data item stored at the rule data mapping in the given rule. For example, processor 120 can select a masking operation if the captured format is for a Social Security number, and select a replacement operation if the captured format is for a name or a phone number.

Real-Time PII Detection

Figure 10:
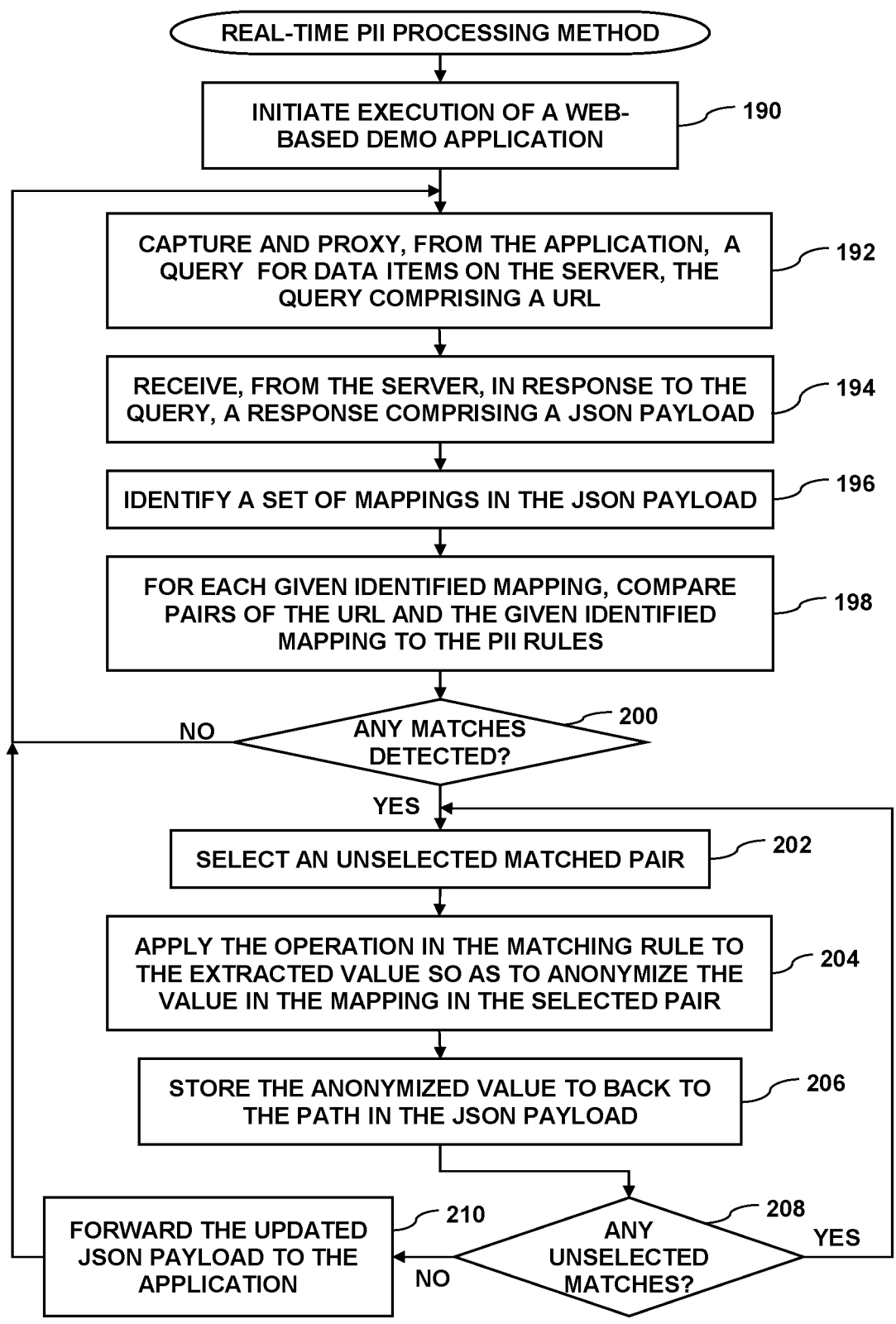
FIG. 10 is a flow diagram that schematically illustrates a method of applying, in real-time, the PII rules to data requests and responses so as to obfuscate PII data in the responses, in accordance with an embodiment of the present invention.

FIG. 10 is a flow diagram that schematically illustrates a method of using PII rules 24 so as to obfuscate, in real-time, PII data items 38B, in accordance with an embodiment of the present invention.

In step 190, browser 80 (executing on host computer 26) initiates a demonstration of target software application 46A. To execute target application 46A, browser 80 conveys, to application server 28, request 42A for a given web page 48A, and in response to receiving request 42A, the application server conveys the requested web page to host computer 26 in response 44A. Upon receiving the requested web page, browser 80 executes the browser executable code in the received web page.

In step 192, browser executable code 50A (downloaded in step 190 and executing in browser 80) generates query 42B for one or more data items 38 stored on resource server 30. In a first demonstration embodiment, query 42B comprises flag 101 instructing proxy application 124 to apply rules 24 to responses 44B.

In a second demonstration embodiment, browser 80 can execute demo application 46C while performing steps 190. In the second demonstration embodiment, browser 80 (executing on host computer 26) initiates a demo application 46C. To execute demo application 46C, browser 80 conveys, obfuscation server, 22 request 42C for a given web page 48C, and in response to receiving request 42C, the obfuscation server conveys the requested web page to host computer 26 in response 44C. Upon receiving the requested web page, browser 80 executes the browser executable code in the received web page so as to generate query 42B.

As described supra, query 42B comprises a given URL 100. Upon detecting flag 101, browser 80 proxies (i.e., redirects) query 42B to obfuscation server 22. Upon receiving query 42B proxy application 124 forwards the received query to resource server 30 as forwarded query 157. While performing step 192, query 42B may also be referred to herein as production query 42B, and URL 100 may also be referred to herein as production URL 100.

Upon receiving forwarded query 157, resource server 30 processes the forwarded query by retrieving the requested data item(s) 38, generating a new JSON payload 110 comprising the retrieved data item(s) and conveys the new JSON payload to obfuscation server 22 in response 44B.

In step 194, proxy application 124 receives, from resource server 30, response 44B comprising the new JSON payload. While performing step 194, response 44B may also be referred to herein as production response 44B.

In step 196, proxy application 124 identifies a set of production data mappings 114 in the received JSON record, and stores the identified data mappings to response data mappings 156.

In step 198 for each given response data mapping 156, proxy application 124 generates a response pair (not shown) comprising the URL in the received query and the given response data mapping, and compares the response pair to rules 24 so as to detect any matches between the response pairs and the rules. In embodiments herein, a given response pair matches a given rule 24 if URL 100 received in step 192 matches rule URL 152 in the given rule, and the response data mapping in the given response pair matches.

As described supra, a given PII URL 144 may comprise one or more wildcard characters. Therefore, a given rule URL 152 may also comprise one or more corresponding wildcard characters, which processor 120 can use for the comparison. For example, if a given rule URL 152 comprises api.abc123.com/XXXX/getEmails (i.e., wherein "XXXX" are the wildcard characters), then based on the wildcard characters in the given rule URL, processor 120 would detect a match (i.e., upon a comparison) between the given rule URL and the following URLs 100:

api.abc123.com/org_id-45678/getEmails
api.example.com/org_id-67890/getEmails

In step 200, If proxy application 124 detects any matches between any of the response pairs and any rules 24, then in step 202 the proxy application selects an unselected response pair that matched a given rule 24, the selected response pair comprising a given response data mapping 156 for a given production value 116 in JSON payload 110.

In step 204, proxy application 124 applies PII operation 150 in the matched rule to the given value so as to anonymize the given value.

In step 206, proxy application 124 stores the anonymized value to the given response data mapping in JSON payload 110.

In step 208, if proxy application 124 detects any unselected response pairs, then the method continues with step 202. However, if proxy application 124 does not detect any unselected response pairs, then in step 210, the proxy application forwards the updated JSON payload to host computer 26 in forwarded response 158, and the method continues with step 192.

Returning to step 200, if proxy application 124 does not detect any matches between any response pair and any rule pair 148, then the method continues with step 192.

Rule-Based PII-Free Data Generation

Figure 12:
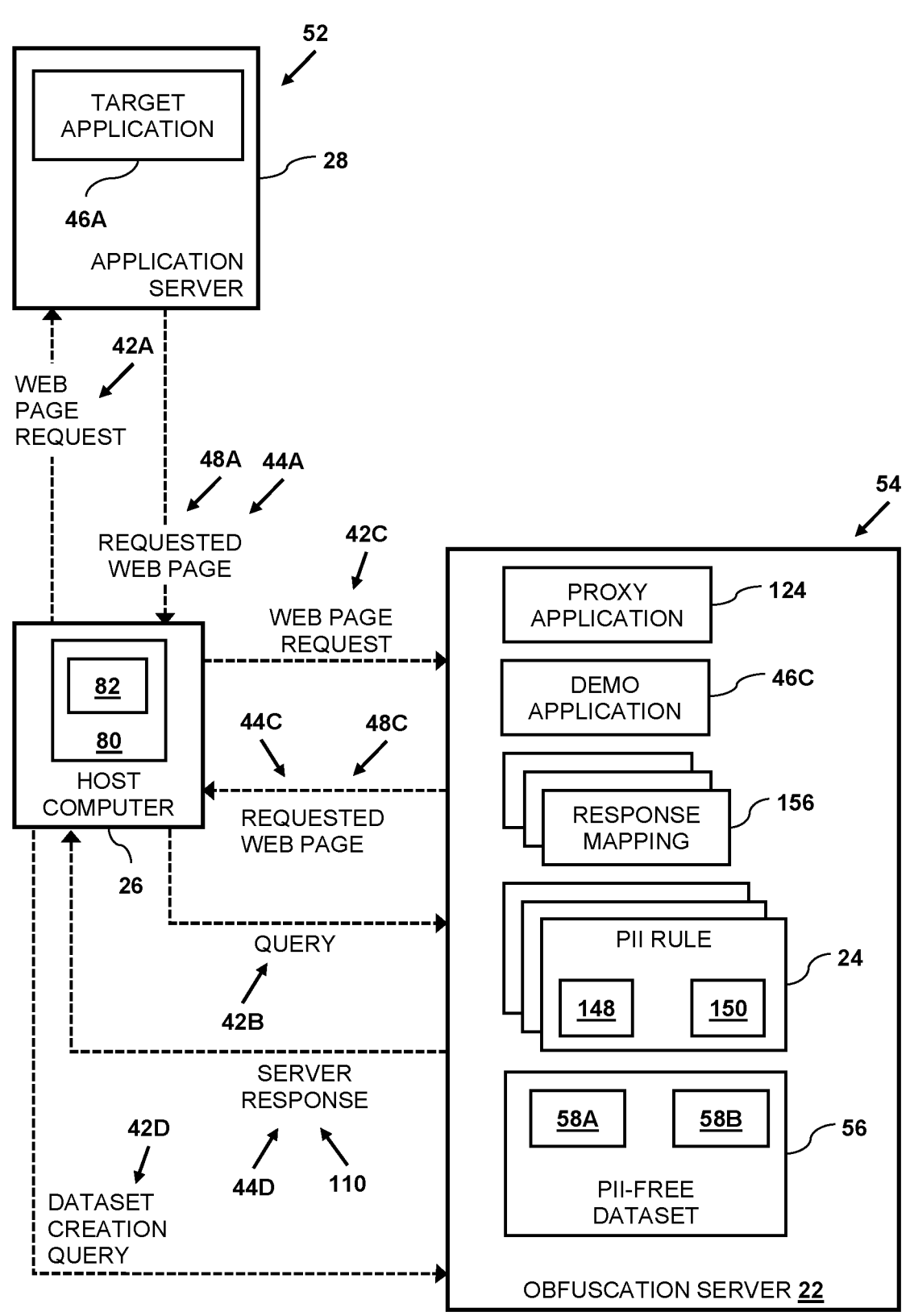
FIG. 12 is a block diagram that schematically illustrates the PII obfuscation server managing the PII-free copy of the dataset, in accordance with an embodiment of the present invention.

FIG. 11 is a flow diagram that schematically illustrates a method of applying the PII rules to dataset 36 data so as to generate PII-free dataset 56, in accordance with an embodiment of the present invention, and FIG. 12 is a block diagram that schematically illustrates the obfuscation server managing the PII-free dataset, in accordance with and embodiment of the present invention.

In step 220, host computer 26 conveys, to obfuscation server 22, dataset creation query 42D comprising a request to generate PII-free dataset 56. In one dataset embodiment, query 42D comprises a request to convert all data items 38 in hosted dataset 36 to data items 58 in PII-free dataset 56. In another dataset embodiment, query 42D comprises a request to convert a subset data items 38 in hosted dataset 36 to data items 58 in PII-free dataset 56.

In step 222, obfuscation server forwards, to resource server 30, the query for data items 38 as forwarded query 157. Upon receiving forwarded query 157, resource server 30 retrieves the requested hosted data items, generates JSON payload 110 comprising the retrieved hosted data items, and forwards the generated JSON payload to obfuscation server 22 in response 44B.

Finally, in step 224, upon receiving response 44B comprising JSON payload 110, obfuscation server 22 uses the received JSON payload and PII rules 24 so as to generate PII-free dataset 56, and the method ends. To generate PII-free dataset 56, obfuscation server 22 can:

Identify PII data items 38A and non-PII data items 38B (i.e., PII data items 38 that are not PII data items 38A) in the received JSON payload.

Save the identified non-PII data items 38B to non-PII data items 58B in PII-free dataset 56.

Use embodiments described supra to anonymize the identified PII data items 38A, and save the anonymized PII data items to anonymized data items 58A in PII-free dataset 56.

Upon generating PII-free dataset 56, the non-PII data items 38B in the received JSON dataset have a one-to-one correspondence with the non-PII data items 58B in the PII-free dataset, and the PII data items 38A in the received JSON dataset have a one-to-one correspondence with the anonymized data items 58A in the PII-free dataset.

FIG. 13 is a flow diagram that schematically illustrates a method of proxying data requests to the PII-free copy of the dataset, in accordance with an embodiment of the present invention.

In step 240, browser 80 (executing on host computer 26) initiates a demonstration of target software application 46A. To execute target application 46A, browser 80 conveys, to application server 28, request 42A for a given web page 48A, and in response to receiving request 42A, the application server conveys the requested web page to host computer 26 in response 44A. Upon receiving the requested web page, browser 80 executes the browser executable code in the received web page.

In step 242, browser executable code 50A (downloaded in step 190 and executing in browser 80) generates query 42B for one or more data items 38 stored on resource server 30. In a first demonstration embodiment, query 42B may comprise flag 101 instructing proxy application 124 to process queries 42B on PII-free dataset 56.

In a second demonstration embodiment, browser 80 can execute demo application 46C while performing steps 240. In the second demonstration embodiment, browser 80 (executing on host computer 26) initiates a demo application 46C. To execute demo application 46C, browser 80 conveys, obfuscation server, 22 request 42C for a given web page 48C, and in response to receiving request 42C, the obfuscation server conveys the requested web page to host computer 26 in response 44C. Upon receiving the requested web page, browser 80 executes the browser executable code in the received web page so as to generate query 42B.

In step 244, obfuscation server 22 receives query 42B, and upon detecting flag 101, the obfuscation server executes the received query on PII-free dataset 56 by retrieving the non-PII data items corresponding to the hosted data items requested by the received query. Obfuscation server 22 can then generate JSON payload 110 comprising the retrieved non-PII data items.

Finally, in step 246, obfuscation server 22 conveys, to host computer 26, response 44D comprising the generated JSON payload, and the method ends.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing data, comprising:
defining a set of rules for protecting sensitive data, each of the rules comprising a reference Uniform Resource Locator (URL) and a reference JavaScript Object Notation (JSON) data mapping to an item of the sensitive data in a JSON payload;

receiving by a proxy, from a software application executing on a host computer, a query comprising a URL for data hosted by a server;

forwarding the received URL from the proxy to the server;

receiving at the proxy, from the server, a response to the forwarded URL, the response comprising a set of values stored in respective JSON data mappings;

comparing the received URL and the JSON data mappings in the response to the set of rules, wherein comparing comprises generating a response pair comprising the received URL and a given response data mapping, and comparing the response pair to the rules to detect matches, wherein a match requires both the received URL matching a rule URL and the given response data mapping matching a rule data mapping; and upon detecting a match:
anonymizing, by the proxy, the value stored at the given JSON data mapping in the response, and
forwarding the response, including the anonymized value, to the software application.

2. The method according to claim 1, wherein the sensitive data comprises Personal Identifiable Information (PII).

3. The method according to claim 2, wherein the PII comprises Protected Health Information (PHI).

4. The method according to claim 1, wherein the software application comprises a demonstration application for a target application that manages the data on the server.

5. The method according to claim 1, wherein the query comprises a Hypertext Transfer Protocol (HTTP) request, and wherein the response comprises an HTTP response comprising the JSON payload comprising the values stored in the respective JSON data mappings.

6. The method according to claim 1, wherein the sensitive data comprises a first dataset, and further comprising storing the updated response to a second dataset, wherein the second dataset comprises a sensitive data-free version of the first dataset.

7. The method according to claim 6, and further comprising subsequent to storing the updated response to the second dataset, receiving, by the proxy from the software application, an additional query comprising the URL for the data hosted by a server, retrieving the requested data from the second dataset, and conveying, to the software application in response to the additional query, the data retrieved from the second dataset.

8. The method according to claim 1, wherein the query comprises a production query, wherein the received URL comprises a production URL, wherein the response comprises a production response, wherein the JSON data mapping in the response comprises a production JSON data mapping, wherein the values comprise production values, and wherein defining a given rule comprises conveying, prior to receiving the production query, a reference query comprising a given reference URL, receiving from the server, a reference response to the forwarded given reference URL, the reference response comprising a set of reference values stored in respective reference JSON data mappings, identifying a given reference value comprising sensitive data, and storing the reference URL and the reference JSON data mapping for the identified given reference value to the given rule.

9. The method according to claim 8, wherein detecting the match comprises detecting a match between the production URL and the given reference URL in the given rule, and detecting a match between the production JSON data mapping in the response and the reference JSON data mapping in the given rule.

10. The method according to claim 8, wherein defining the given rule further comprises defining an anonymization operation, and storing the anonymization operation to the given rule.

11. The method according to claim 10, wherein anonymizing the value stored at the given production JSON data mapping in the production response comprises the performing the anonymization operation in the given rule on the production value stored at the given production JSON data mapping in the production response.

12. The method according to claim 8, wherein identifying the reference value comprising sensitive data comprises identifying a format of the reference value, comparing the identified format to a list of specified formats, and detecting a match between the identified format and a given specified format.

13. The method according to claim 8, wherein the reference JSON data mapping comprises a first reference JSON data mapping, and further comprising detecting an additional instance of the given reference value in the reference response, identifying a second reference JSON data mapping for the additional instance the given reference value, and storing the given reference URL and the second reference JSON data mapping to an additional rule.

14. The method according to claim 8, wherein identifying the reference value comprising sensitive data comprises comparing the reference values to a list of keywords, and detecting a match between the reference value and a given keyword.

15. The method according to claim 8, wherein the reference values in the reference response comprise respective keys, and wherein identifying the reference value comprising sensitive data comprises comparing the key corresponding to the reference value to a list of keywords, and detecting a match between the corresponding key and a given keyword.

16. The method according to claim 8, wherein identifying the reference value comprising sensitive data comprises comparing the given reference URL to a list of keywords, and detecting a match between the corresponding key and a given keyword.

17. The method according to claim 1, wherein a given reference URL comprises one or more wildcard characters.

18. An apparatus for processing data, comprising:
a memory configured to store a proxy; and
one or more processors configured:
    to define, in the memory, a set of rules for protecting sensitive data, each of the rules comprising a reference Uniform Resource Locator (URL) and a reference JavaScript Object Notation (JSON) data mapping to an item of the sensitive data in a JSON payload, to receive by a proxy, from a software application executing on a host computer, a query comprising a URL for data hosted by a server,
    to forward the received URL from the proxy to the server,
    to receive at the proxy, from the server, a response to the forwarded URL, the response comprising a set of values stored in respective JSON data mappings,
    to compare the received URL and the JSON data mappings in the response to the set of rules, wherein comparing comprises generating a response pair comprising the received URL and a given response data mapping, and comparing the response pair to the rules to detect matches, wherein a match requires both the received URL matching a rule URL and the given response data mapping matching a rule data mapping, and
upon detecting a match:
    to anonymize, by the proxy, the value stored at the given JSON data mapping in the response, and
    to forward the response, including the anonymized value, to the software application.

19. A computer software product for demonstrating a target application, comprising a non-transitory computer-readable medium, in which program instructions are stored, which instructions, when read by a computer, cause the computer:
to define a set of rules for protecting sensitive data, each of the rules comprising a reference Uniform Resource Locator (URL) and a reference JavaScript Object Notation (JSON) data mapping to an item of the sensitive data in a JSON payload;
to receive by a proxy, from a software application executing on a host computer, a query comprising a URL for data hosted by a server;
to forward the received URL from the proxy to the server;
to receive at the proxy, from the server, a response to the forwarded URL, the response comprising a set of values stored in respective JSON data mappings;
to compare the received URL and the JSON data mappings in the response to the set of rules, wherein comparing comprises generating a response pair comprising the received URL and a given response data mapping, and comparing the response pair to the rules to detect matches, wherein a match requires both the received URL matching a rule URL and the given response data mapping matching a rule data mapping; and
upon detecting a match:
    to anonymize, by the proxy, the value stored at the given JSON data mapping in the response, and
    to forward the response, including the anonymized value, to the software application.

* * * * *